United States Patent
Classen et al.

(10) Patent No.: US 8,596,122 B2
(45) Date of Patent: Dec. 3, 2013

(54) MICROMECHANICAL COMPONENT AND METHOD FOR OPERATING A MICROMECHANICAL COMPONENT

(75) Inventors: Johannes Classen, Reutlingen (DE); Lars Tebje, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 352 days.

(21) Appl. No.: 12/736,609

(22) PCT Filed: Apr. 1, 2009

(86) PCT No.: PCT/EP2009/053860
§ 371 (c)(1),
(2), (4) Date: Feb. 8, 2011

(87) PCT Pub. No.: WO2009/132917
PCT Pub. Date: Nov. 5, 2009

(65) Prior Publication Data
US 2011/0154899 A1 Jun. 30, 2011

(30) Foreign Application Priority Data

Apr. 29, 2008 (DE) .......................... 10 2008 001 442

(51) Int. Cl.
*G01P 15/125* (2006.01)
(52) U.S. Cl.
USPC .................................... 73/514.32; 73/514.38
(58) Field of Classification Search
USPC ...................... 73/510, 514.32, 514.36, 514.38
See application file for complete search history.

(56) References Cited

U.S. PATENT DOCUMENTS

| 5,806,365 A | 9/1998 | Zunino et al. |
| 2005/0005698 A1 | 1/2005 | McNeil et al. |

FOREIGN PATENT DOCUMENTS

| DE | 197 19 779 | 11/1998 |
| JP | 10-48247 | 2/1998 |
| JP | 2000-19198 | 1/2000 |
| JP | 2000-81448 | 3/2000 |
| JP | 2006-175555 | 7/2006 |
| JP | 2007-298405 | 11/2007 |
| JP | 2007-530914 | 11/2007 |
| WO | WO 2005/121812 | 12/2005 |
| WO | WO 2008/043831 | 4/2008 |

*Primary Examiner* — John Chapman, Jr.
(74) *Attorney, Agent, or Firm* — Kenyon & Kenyon LLP

(57) ABSTRACT

A micromechanical component comprising a substrate, a seismic mass, and first and second detection means, the substrate having a main extension plane and the first detection means being provided for detection of a substantially translational first deflection of the seismic mass along a first direction substantially parallel to the main extension plane, and the second detection means further being provided for detection of a substantially rotational second deflection of the seismic mass about a first rotation axis parallel to a second direction substantially perpendicular to the main extension plane. The seismic mass can be embodied as an asymmetrical rocker, with the result that accelerations can be sensed as rotations. Detection can be accomplished via capacitive sensors.

19 Claims, 2 Drawing Sheets

MICROMECHANICAL COMPONENT AND METHOD FOR OPERATING A MICROMECHANICAL COMPONENT

BACKGROUND OF THE INVENTION

1. Field of the Invention

The present invention proceeds from a micromechanical component.

2. Description of Related Art

Micromechanical components of this kind are generally known. The published German patent application document DE 197 19 779 A1, for example, discloses an acceleration sensor having an oscillating structure suspended movably on a substrate and deflectable in one direction on the basis of an acceleration action, and evaluation means for sensing an acceleration-related deflection of the oscillating structure. Disadvantageously, however, no provision is made for sensing, with a single acceleration sensor, acceleration actions parallel to a plurality of directions that are perpendicular to one another. Multi-channel acceleration measurement therefore requires the use of a plurality of such acceleration sensors that are oriented differently from one another.

SUMMARY OF THE INVENTION

The micromechanical component according to the present invention, and the method according to the present invention for operating a micromechanical component in accordance with the coordinated claims, have the advantage as compared with the existing art of making possible, with the only one seismic mass, separate detection of at least two acceleration effects, oriented perpendicular to one another, on the micromechanical component. This is achieved by the fact both that the first deflection of the seismic mass in the form of a translation of the seismic mass substantially parallel to the first direction is detectable or measurable by the first detection means, and that a second deflection of the seismic mass in the form of a rotation of the seismic mass substantially about the first rotation axis is also detectable or measurable by the second detection means. An at least two-channel acceleration measurement is thus enabled with only a single seismic mass, i.e. the micromechanical component is sensitive to acceleration forces simultaneously in the first direction and in a third direction perpendicular to the first direction. This makes possible a realization of a multi-channel acceleration sensor that is considerably more compact in terms of space, and consumes less power, as compared with the existing art, so that manufacturing costs on the one hand and implementation outlay on the other hand are considerably decreased. The seismic mass preferably exhibits an asymmetrical mass distribution with respect to the first rotation axis or with reference to a line intersecting the first rotation axis and extending parallel to the third direction, so that in particular an acceleration effect parallel to the third direction, i.e. perpendicular to the first direction and perpendicular to the first rotation axis, generates a torque acting on the seismic mass and thus produces the second deflection of the seismic mass substantially in the form of a rotation of the seismic mass about the first rotation axis. For purposes of the present invention, "detection and measurement" encompasses in particular any qualitative and/or quantitative recognition and identification of the respective deflection.

Advantageous embodiments and refinements of the invention may be gathered from the following description with reference to the drawings.

According to a preferred refinement, provision is made that the micromechanical component has third detection means for detecting a substantially rotational third deflection of the seismic mass about a second rotation axis parallel to a third direction substantially parallel to the main extension plane. Realization of a three-channel acceleration sensor is thus possible in particularly advantageous fashion, since in addition to measurement of the acceleration effect parallel to the first and to the third direction, a measurement of an acceleration effect on the micromechanical component parallel to the second direction is also made possible by way of the third detection means. In particular, the seismic mass also has an asymmetrical mass distribution with reference to the second rotation axis, which corresponds in particular to the line, so that an acceleration force acting on the seismic mass perpendicular to the second rotation axis and perpendicular to the first direction generates a further torque acting on the seismic mass, and thus produces substantially a rotation of the seismic mass about the second rotation axis.

According to a preferred refinement, provision is made that the seismic mass is embodied as a rocker that is mounted in rotationally movable fashion in particular about the first and/or the second rotation axis. Advantageously, realization of the seismic mass as a rocker that is rotationally movable about the first and/or the second axis makes possible particularly simple implementation of the corresponding detection means, for example below the seismic mass, the rocker preferably having an asymmetrical mass distribution with reference to the respective rotation axis.

According to a further preferred refinement, provision is made that the first, second, and/or third detection means encompass electrodes, in particular for capacitive measurement of the first, second, and/or third deflection, the first and/or second detection means preferably being embodied as finger electrodes, and/or the third detection means preferably as planar electrodes. Particularly advantageously, the first, second, and/or third detection means, which preferably allow a comparatively precise detection or measurement of acceleration effects parallel to the first, the second, and/or the third direction by way of capacitive measurement of the first, second, and third deflection, can thus be realized in comparatively simple and economical fashion. The use of finger electrodes enables, particularly preferably, a differential measurement of the acceleration effects parallel to the first, the second, and/or the third direction.

According to a further preferred refinement, provision is made that the first and/or the second detection means are disposed on at least one edge of the seismic mass and/or in first and/or second recesses of the seismic mass. This makes possible, particularly advantageously, integration of the first and/or second detection means, and in particular of a plurality of finger electrodes, into the micromechanical component or into the seismic mass in comparatively compact fashion with regard to installation space. Particularly preferably, provision is made for a differential evaluation of the first and/or second deflection by way of the first and/or second detection means.

According to a further preferred refinement, provision is made that the third detection means are disposed perpendicular to the main extension plane, overlapping the seismic mass. The third deflection is thus, particularly advantageously, measurable parallel to the third direction, which is preferably oriented perpendicular to the main extension plane. The asymmetrical mass distribution of the seismic mass with reference to the second rotation axis makes possible, particularly preferably, a differential evaluation of the third deflection by way of third detection means disposed "below" the seismic mass, thus rendering unnecessary the placement (comparatively complex in terms of process engineering) of electrodes "above" the seismic mass for differential measurement of the third deflection.

According to a further preferred refinement, provision is made that the seismic mass is connected to the substrate via spring elements, in particular torsional and/or flexural springs, the first spring elements preferably being embodied in such a way that the first, the second, and/or the third deflection of the seismic mass are enabled. Also, particularly advantageously, thanks to the use of only a single seismic mass for measuring acceleration effects parallel to the first, second, and third direction, as compared with the existing art only the first spring elements are necessary for movable mounted of the seismic mass. The first spring elements preferably encompass two torsional/flexural springs which are warped more or less in the first direction during the first deflection; which are warped oppositely parallel to the first direction during the second deflection, i.e. one of the two torsional/flexural springs is deflected in the first direction and the second of the two torsional/flexural springs antiparallel to the first direction; and which execute a torsion about the second rotation axis during the third deflection motion.

According to a further preferred refinement, provision is made that the micromechanical component encompasses an acceleration sensor, the first, the second, and the third direction being in particular oriented perpendicular to one another so as to make possible, particularly advantageously, a measurement of acceleration effects on the micromechanical component in all three spatial directions using only a single seismic mass.

A further subject of the present invention is a method for operating a micromechanical component, an acceleration of the micromechanical component in the first direction being detected by a measurement of the substantially translational first deflection of the seismic mass, and an acceleration of the micromechanical component in a second direction substantially perpendicular to the first direction being detected by a measurement of the substantially rotational second deflection of the seismic mass, so that in contrast to the existing art, a substantially two-channel measurement of acceleration effects on the micromechanical component is made possible, with only a single seismic mass, by measuring the substantially translational first deflection and the substantially rotational second deflection.

According to a preferred refinement, provision is made that an acceleration of the micromechanical component in a third direction substantially perpendicular respectively to the first and to the second direction is detected by a measurement of the substantially rotational third deflection of the seismic mass, so that advantageously, an acceleration effect on the micromechanical component parallel to the third direction is additionally measurable with only the one seismic mass.

According to a further preferred refinement, provision is made that the first deflection is measured with the first detection means, the second deflection with the second detection means, and/or the third deflection with the third detection means, so that, particularly advantageously, the acceleration effects in the first, second, and/or third direction are measurable mutually independently by way of the first, second, and/or third detection means.

Exemplifying embodiments of the present invention are depicted in the drawings and explained in more detail in the description that follows.

DETAILED DESCRIPTION OF THE INVENTION

Figure 1A:
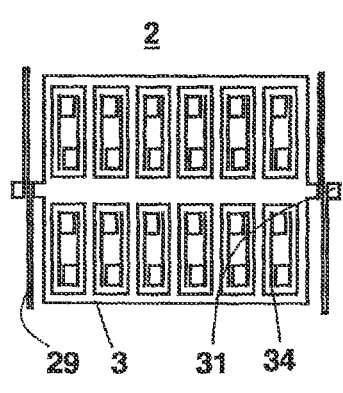
FIGS. 1a, 1b, and 1c are schematic plan views of acceleration sensors in accordance with the existing art that are sensitive in the X, Y, and Z directions.

In the various Figures, identical parts are always provided with the same reference characters and are therefore, as a rule, also each mentioned or named only once.

Figure 1B:
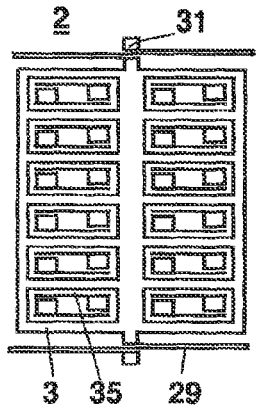
Figure 1C:
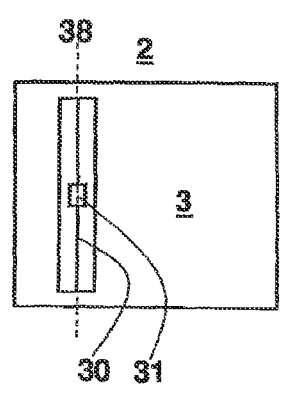

FIGS. 1a, 1b, and 1c are schematic views of acceleration sensors in accordance with the existing art that are sensitive in the X, Y, and Z directions; the acceleration sensor illustrated in FIG. 1a and sensitive parallel to the X direction has a substrate 2 and a seismic mass 3, the X direction extending parallel to a main extension plane of substrate 2 and seismic mass 3 being attached to substrate 2, by way of two spring elements 29 and two attachment anchors 31, in such a way that seismic mass 2 is movable parallel to the X direction relative to substrate 2. An acceleration force acting on the acceleration sensor and having a component parallel to the X direction generates, as a result of the inertia of seismic mass 3 with respect to substrate 2, a deflection of said mass parallel to the X direction. This deflection is measured by detection means 34 in the form of electrodes, which are disposed in recesses of seismic mass 3 and are secured in stationary fashion to substrate 2. Seismic mass 3, or sub-regions of seismic mass 3, form the counterelectrodes to the electrodes, so that the deflection of seismic mass 3 is measurable via a change in capacitance between the electrodes and counterelectrodes. FIG. 1b depicts an acceleration sensor, sensitive in the Y direction, for detecting an acceleration action parallel to the Y direction; the Y direction extends, in particular, parallel to the main extension plane and perpendicular to the X direction, and the acceleration sensor sensitive in the Y direction is identical to the acceleration sensor illustrated in FIG. 1a and sensitive in the X direction, and is simply disposed with a 90-degree rotation in the main extension plane. FIG. 1c depicts an acceleration sensor sensitive in the Z direction; the Z direction extends perpendicular to the X direction and perpendicular to the Y direction, and the acceleration sensor that is sensitive in the Z direction likewise has a substrate 2 and a seismic mass 3 movable with respect to substrate 2, said mass here being in the form of a rocker that is attached to substrate 2 by way of an attachment anchor 31 in a recess of seismic mass 3 and is mounted in the recess by way of a torsional spring 30, rotatably about a rotation axis 38 parallel to torsional spring 30, i.e. rotation axis 38 is disposed in particular parallel to the Y direction and passes substantially axially through torsional spring 30. As a result of an asymmetrical mass distribution of seismic mass 3 relative to rotation axis 38, an acceleration action on the acceleration sensor parallel to the Z direction produces a rotation of seismic mass 3 about rotation axis 38, a rotation of seismic mass 3 being measurable by way of planar electrodes 6 that are disposed below the seismic mass, i.e. in the Z direction overlapping seismic mass 3, and on or in substrate 2. According to the existing art, all three acceleration sensors sensitive in the X, Y, and Z direction must therefore be used for multi-channel measurement of acceleration actions in all three spatial directions simultaneously.

Figure 2A:
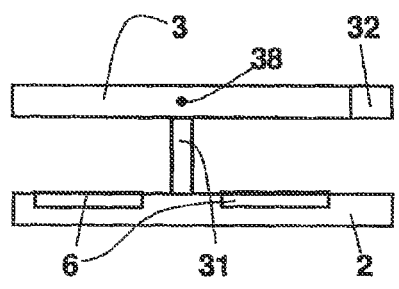
FIGS. 2a and 2b are schematic side views of the acceleration sensor in accordance with the existing art that is sensitive in the Z direction.
Figure 2B:
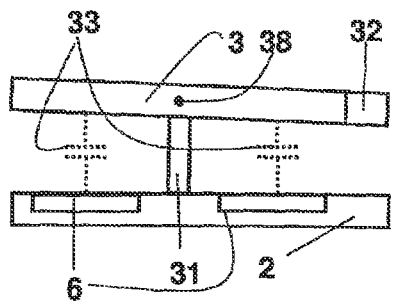

FIGS. 2a and 2b are schematic side views of the acceleration sensor in accordance with the existing art that is sensitive in the Z direction, the asymmetrical mass distribution of seismic mass 3 with reference to rotation axis 38 being illustrated by an additionally depicted sub-region 32 of the seismic mass. An electrical capacitance measurable between planar electrodes 6 and seismic mass 3, indicated symbolically by the schematic plate capacitors 33 in FIG. 2b, changes in value during a rotation of seismic mass 3, so that an acceleration effect on the acceleration sensor in the Z direction is measurable.

Figure 3A:
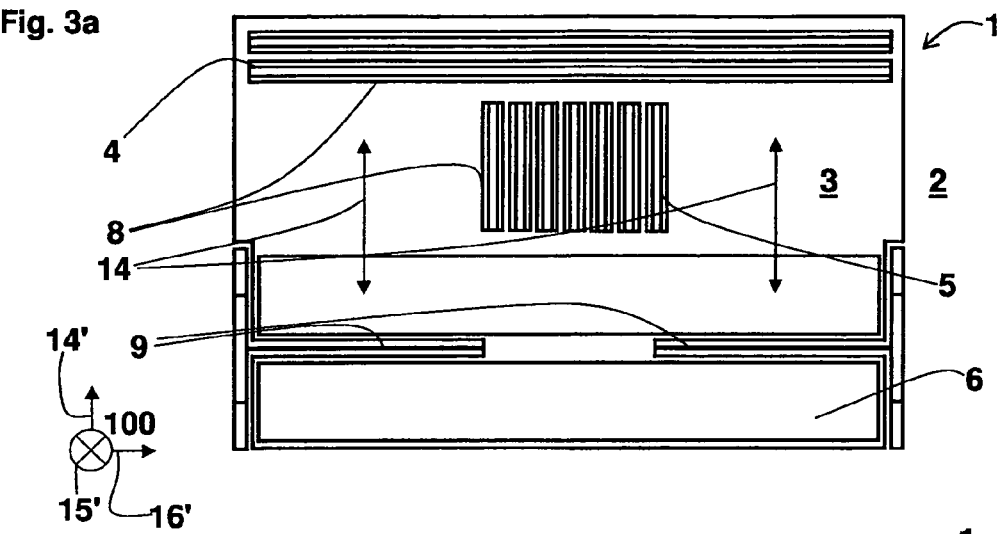
FIGS. 3a, 3b, and 3c are schematic views of a micromechanical component in accordance with an exemplifying embodiment of the present invention.
Figure 3B:
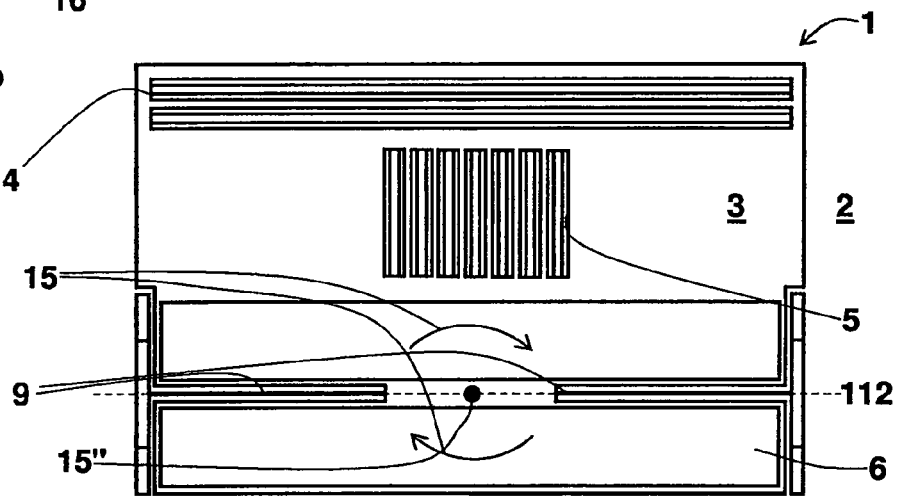
Figure 3C:
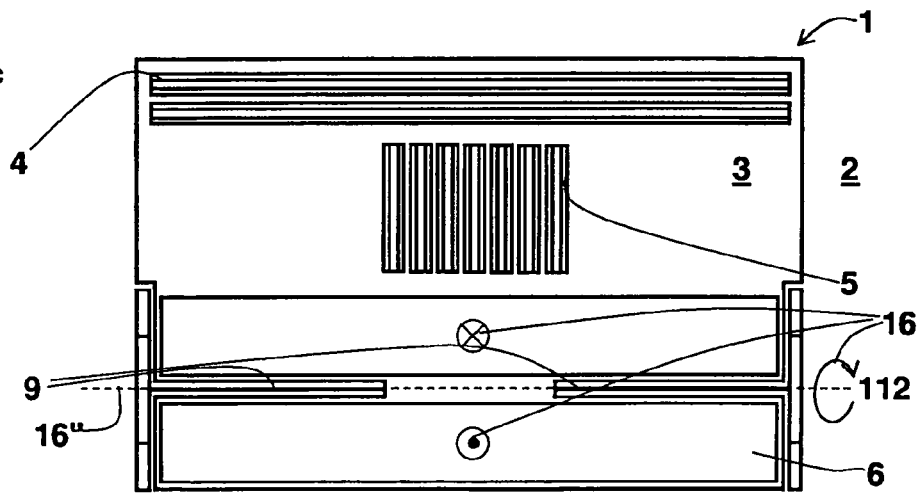

FIGS. 3a, 3b, and 3c are schematic views of a first deflection 14, a second deflection 15, and a third deflection 16 of a seismic mass 3 of a micromechanical component 1 in accordance with an exemplifying embodiment of the present invention, micromechanical component 1 having a substrate 2, a seismic mass 3, and first, second, and third detection means 4, 5, 6; substrate 2 having a main extension plane 100; and first detection means 4 being provided for detection of a substantially translational first deflection 14 of seismic mass 3 depicted in FIG. 3a along a first direction 14' substantially parallel to main extension plane 100, first deflection 14 being generated by an acceleration action on micromechanical component 1 parallel to first direction 14'. Second detection means 5 are provided for detection of a substantially rotational second deflection 15 of seismic mass 3, depicted in FIG. 3b, about a first rotation axis 15" parallel to a second direction 15' substantially perpendicular to main extension plane 100, second deflection 15 being generated by an acceleration effect on micromechanical component 1 parallel to a third direction 16' extending perpendicular to first direction 14' and perpendicular to second direction 15', since seismic mass 1 has an asymmetrical mass distribution with reference to first rotation axis 15" and with reference to a line 112 intersecting first rotation axis 15" and extending parallel to third direction 16'. Third detection means 6 are provided for detection of a substantially rotational third deflection 16 of seismic mass 3, depicted in FIG. 3c, about a second rotation axis 16" parallel to third direction 16', third deflection 16 being generated by an acceleration action on micromechanical component 1 parallel to second direction 15' and by the asymmetrical mass distribution of the seismic mass with reference to line 112, and seismic mass 1 thus being embodied as a rocker that is mounted rotatably or tiltably respectively about the first and the second rotation axis 15", 16". The first and second detection means 4, 5 are disposed in recesses 8 of seismic mass 3 and are embodied as electrodes, so that first and second deflection 14, 15 are measurable, preferably differentially in each case, by way of a change in capacitance at the respective electrodes, in particular in accordance with the X- and Y-sensitive acceleration sensors illustrated in FIGS. 1a and 1b. Third detection means 6 are disposed as planar electrodes parallel to second direction 15' below seismic mass 3, and function in particular in accordance with the principle of the Z-sensitive acceleration sensor depicted in FIGS. 1c, 2a, and 2b. Seismic mass 3 is attached to substrate 2 via spring elements 9 in the form of two torsional/flexural springs, and is movably mounted with respect to substrate 2 in order to enable first, second, and third deflection 14, 15, 16. During first deflection 14, the two torsional/flexural springs are warped more or less in the first direction. During the second deflection, the two torsional/flexural springs are warped oppositely parallel to the first direction, i.e. one of the two torsional/flexural springs is deflected in the first direction, and the second of the two torsional/flexural springs antiparallel to the first direction, so that seismic mass 3 executes in totality substantially a rotation about first rotation axis 15". During the third deflection motion, the torsional/flexural springs are rotated more or less about the second rotation axis, so that seismic mass 3 executes substantially a rotation about second rotation axis 16".

What is claimed is:

1. A micromechanical component comprising:
a substrate having a main extension plane,
a seismic mass,
spring elements connecting the substrate to the seismic mass, and first, second, and third detection means,
wherein:
the first detection means are provided for detection of a substantially translational first deflection of the seismic mass along a first direction substantially parallel to the main extension plane,
the second detection means are provided for detection of a substantially rotational second deflection of the seismic mass about a first rotation axis parallel to a second direction substantially perpendicular to the main extension plane,
the third detection means are provided for detection of a substantially rotational third deflection of the seismic mass about a second rotation axis parallel to a third direction substantially parallel to the main extension plane, and
each spring element in the micromechanical component that connects the substrate to the seismic mass is arranged to rotate about the second rotation axis during the third deflection.

2. The micromechanical component as recited in claim 1, wherein the seismic mass is embodied as a rocker in a rotationally movable fashion about at least one of the first and the second rotation axis.

3. The micromechanical component as recited in claim 2, wherein at least one of the first, second, and third detection means encompass electrodes, for capacitive measurement of the first, second, or third deflection, respectively.

4. The micromechanical component as recited in claim 2, wherein at least one of the first and the second detection means are disposed on at least one edge of the seismic mass or in a recess of the seismic mass.

5. The micromechanical component as recited in claim 2, wherein the third detection means overlap the seismic mass.

6. The micromechanical component as recited in claim 1, wherein at least one of the first, second, and third detection means encompass electrodes, for capacitive measurement of the first, second, or third deflection, respectively.

7. The micromechanical component as recited in claim 6, wherein at least one of the first and second detection means are embodied as comb or finger electrodes, and the third detection means is embodied as planar electrodes.

8. The micromechanical component as recited in claim 6, wherein at least one of the first and the second detection means are disposed on at least one edge of the seismic mass or in a recess of the seismic mass.

9. The micromechanical component as recited in claim 1, wherein at least one of the first and the second detection means are disposed on at least one edge of the seismic mass or in a recess of the seismic mass.

10. The micromechanical component as recited in claim 1, wherein the third detection means overlap the seismic mass.

11. The micromechanical component as recited in claim 1, wherein the seismic mass is connected to the substrate via spring elements.

12. The micromechanical component as recited in claim 11, wherein the spring elements are at least one of torsional and flexural springs, the spring elements being embodied in such a way that at least one of the first and the second deflection of the seismic mass are enabled.

13. The micromechanical component as recited in claim 1, wherein the micromechanical component encompasses an acceleration sensor, and the first, the second, and the third direction are oriented perpendicular to one another.

14. A method for operating a micromechanical component as recited in claim 1 comprising: detecting an acceleration of the micromechanical component in the first direction by a measurement of the substantially translational first deflection of the seismic mass, and detecting an acceleration of the micromechanical component in a second direction substantially perpendicular to the first direction by a measurement of the substantially rotational second deflection of the seismic mass.

15. The method as recited in claim 14, further comprising detecting an acceleration of the micromechanical component in a third direction substantially perpendicular respectively to the first and to the second direction by a measurement of the substantially rotational third deflection of the seismic mass.

16. The method as recited in claim 14, wherein the first deflection is measured with the first detection means, and the second deflection is measured with the second detection means.

17. The micromechanical component as recited in claim 1, wherein the spring elements are arranged so that during a first deflection each spring element is warped in the first direction and during the second deflection each spring element is warped either in the first direction or antiparallel to the first direction.

18. The micromechanical component as recited in claim 1, wherein the micromechanical component includes only two spring elements.

19. A micromechanical component comprising:
a substrate having a main extension plane,
a seismic mass,
spring elements connecting the substrate to the seismic mass, and
first, second, and third detection means, wherein:
   the first detection means are provided for detection of a substantially translational first deflection of the seismic mass along a first direction substantially parallel to the main extension plane,
   the second detection means are provided for detection of a substantially rotational second deflection of the seismic mass about a first rotation axis parallel to a second direction substantially perpendicular to the main extension plane,
   the third detection means are provided for detection of a substantially rotational third deflection of the seismic mass about a second rotation axis parallel to a third direction substantially parallel to the main extension plane,
   the spring elements are arranged so that during the third deflection each spring element is rotated about the second rotation axis,
wherein the seismic mass has an asymmetrical mass distribution with reference to the second rotation axis.

* * * * *

UNITED STATES PATENT AND TRADEMARK OFFICE
CERTIFICATE OF CORRECTION

PATENT NO. : 8,596,122 B2 Page 1 of 1
APPLICATION NO. : 12/736609
DATED : December 3, 2013
INVENTOR(S) : Classen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 453 days.

Signed and Sealed this

Twenty-second Day of September, 2015

Michelle K. Lee
*Director of the United States Patent and Trademark Office*